United States Patent
Naim et al.

(10) Patent No.: US 10,009,883 B1
(45) Date of Patent: Jun. 26, 2018

(54) SEARCHING THROUGH MODULATED DATA TO DETERMINE THE FORMAT OF A CONTROL CHANNEL

(71) Applicant: Sprint Spectrum L.P., Overland Park, KS (US)

(72) Inventors: Muhammad A. Naim, Ashburn, VA (US); Yu Zhou, Herndon, VA (US); Luca Zappaterra, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 222 days.

(21) Appl. No.: 14/938,615

(22) Filed: Nov. 11, 2015

(51) Int. Cl.
*H04W 72/04* (2009.01)
*H04W 88/02* (2009.01)

(52) U.S. Cl.
CPC ..... *H04W 72/042* (2013.01); *H04W 72/0446* (2013.01); *H04W 88/02* (2013.01)

(58) Field of Classification Search
None
See application file for complete search history.

(56) References Cited

U.S. PATENT DOCUMENTS

2017/0164395 A1* 6/2017 Papasakellariou ............... H04W 72/1273

OTHER PUBLICATIONS

U.S. Appl. No. 14/531,628, filed Nov. 3, 2014.
PDCCH Blind Search and DCI Decoding—MATLAB & Simulink Example, The Mathworks, Inc., available at http://www.mathworks.com/help/lte/examples/pdcchblindsearchanddcidecoding.html, 2015.
Kumar, Praveen, "LTE PDCCH Blind Decoding Part-1," 3G LTE Technical Info, available at http://3g4gtechinfo.blogspot.com/2013/05/ltepdcchblinddecodingpart1.html, May 17, 2013.

* cited by examiner

*Primary Examiner* — Sulaiman Nooristany

(57) ABSTRACT

In an example method, a UE receives modulated data transmitted from a base station in a given subframe, and searches through the received modulated data to find the physical control format indicator channel (PCFICH) of the given subframe. The searching is based on the PCFICH having a predefined structure. Upon thereby finding the PCFICH of the given subframe, the UE determines the control format indicator (CFI) carried by the PCFICH of the given subframe. The UE then uses the CFI carried by the PCFICH of the given subframe as a basis to read a portion of a downlink control channel of the given subframe.

19 Claims, 9 Drawing Sheets

| CFI | BINARY CODEWORD | TIME SEGMENT(S) |
|---|---|---|
| 1 | 0,1,0, . . . 1 | 1 |
| 2 | 0,1,1, . . . 1 | 1 AND 2 |
| 3 | 0,1,0, . . . 0 | 1, 2, AND 3 |
| 4 | 1,1,0, . . . 1 | 2 |
| 5 | 1,1,0, . . . 1 | 2 AND 3 |
| 6 | 0,1,1, . . . 1 | 2, 3, AND 4 |
| ⋮ | ⋮ | ⋮ |
| 16 | 0,1,1, . . . 1 | 1 AND 4 |
| 17 | 1,1,0, . . . 1 | 1 AND 5 |
| ⋮ | ⋮ | ⋮ |
| 25 | 0,0,0, . . . 1 | 2 AND 4 |
| ⋮ | ⋮ | ⋮ |

Fig. 6

SEARCHING THROUGH MODULATED DATA TO DETERMINE THE FORMAT OF A CONTROL CHANNEL

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz. On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

In LTE, downlink air interface resources are mapped in the time domain and in the frequency domain. In the time domain, LTE defines a continuum of 10-millisecond (ms) frames, divided into 1 ms subframes and 0.5 ms slots. With this arrangement, each subframe is considered to be a transmission time interval (TTI). Each frame has 10 subframes, and each subframe has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), in one OFDM symbol.

LTE further defines a particular grouping of time-domain and frequency-domain resources as a downlink resource block. In the time domain, each downlink resource block has a duration corresponding to one sub-frame (1 ms). In the frequency domain, each downlink resource block consists of a group of 12 sub-carriers that are used together to form OFDM symbols. Typically, the 1 ms duration of a downlink resource block accommodates 14 OFDM symbols, each spanning 66.7 microseconds, with a 4.69 microsecond guard band (cyclic prefix) added to help avoid inter-symbol interference. Depending on the bandwidth of the downlink carrier, the air interface may support transmission on a number of such downlink resource blocks in each subframe. For instance, a 5 MHz carrier supports 25 resource blocks in each subframe, whereas a 15 MHz carrier supports 75 resource blocks in each subframe.

The smallest unit of downlink resources is the resource element. Each resource element corresponds to one sub-carrier and one OFDM symbol. Thus, a resource block that consists of 12 sub-carriers and 14 OFDM symbols has 168 resource elements. Further, each OFDM symbol and thus each resource element can represent a number of bits, with the number of bits depending on how the data is modulated. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits.

Within a resource block, and cooperatively across all of the resource blocks of the carrier bandwidth, different resource elements can have different functions. In particular, a certain number of the resource elements (e.g., 8 resource elements distributed throughout the resource block) may be reserved for reference signals used for channel estimation. In addition, a certain number of the resource elements (e.g., resource elements in the first one, two, or three OFDM symbols) may be reserved for the PDCCH and other control channels (e.g., a physical hybrid automatic repeat request channel (PHICH)), and most of the remaining resource elements (e.g., most of the resource elements in the remaining OFDM symbols) would be left to define the PDSCH.

Across the carrier bandwidth, each subframe of the LTE air interface thus defines a control channel space that generally occupies a certain number of 66.7 microsecond symbol time segments (e.g., the first one, two, or three such symbol time segments), and a PDSCH space that generally occupies the remaining symbol time segments, with certain exceptions for particular resource elements. The actual number of symbol segments that the control channel space occupies in a given subframe is indicated by a Control Format Indicator (CFI) carried by a Physical Control Format Indicator Channel (PCFICH). In each subframe, the PCFICH is defined in 16 resource elements of the first symbol time segment. The 16 resource elements are spread across four resource element groups (REGs), with each REG equidistantly spread apart from each other and containing four consecutive resource elements (or four consecutive resource elements separated by one or more reference signals). The exact location of the four REGs within the first symbol time segment is determined using a formula having inputs that include a physical cell ID (a number assigned to each base station, ranging from 0 to 503) and carrier bandwidth.

Further, the 16 resource elements of the PCFICH carry 16 modulation symbols. With QPSK modulation, each modulation symbol represents two bits, such that the 16 resource elements carry 32 bits of data. These 32 bits of data cooperatively form a binary codeword corresponding to a CFI. Depending on the configuration of the control channel space for a given subframe, the binary codeword may be one of three binary codewords that each correspond to a respective CFI and respective number of symbol time segments. In practice, the UE may determine the CFI carried by the PCFICH in each subframe to determine the format of the control channel space of the subframe. For instance, the UE may determine that the PCFICH of a given subframe carries a first binary codeword corresponding to a first CFI, meaning that the control channel space occupies the first symbol time segment of the given subframe, or determine that the PCFICH of the given subframe carries a second binary codeword corresponding to a second CFI, meaning that the control channel space occupies the first and second symbol time segments of the given subframe.

One of the main functions of the PDCCH in LTE is to carry "Downlink Control Information" (DCI) messages to served UEs. LTE defines various types or "formats of DCI messages, to be used for different purposes, such as to indicate how a UE should receive data in the PDSCH of the current subframe, or how the UE should transmit data on the PUSCH in an upcoming subframe. For instance, a DCI message in a particular subframe may schedule downlink communication of bearer data to a particular UE (i.e., a UE-specific data transmission), by specifying one or more particular PDSCH segments that carry the bearer data in the current subframe, what modulation scheme is used for that downlink transmission, and so forth. And as another example, a DCI message in a particular subframe may indicate the presence of one or more paging messages carried in particular PDSCH segments and may cause certain UEs to read the PDSCH in search of any relevant paging messages.

Each DCI message may span a particular set of resource elements on the PDCCH (e.g., one, two, four, or eight control channel elements (CCEs), each including 36 resource elements) and may include a cyclic redundancy check (CRC) that is masked (scrambled) with an identifier (e.g., a particular radio network temporary identifier (RNTI)). In practice, a UE may monitor the PDCCH in each subframe in search of a DCI message having one or more particular RNTIs. And if the UE finds such a DCI message, the UE may then read that DCI message and proceed as indicated. For instance, if the DCI message schedules downlink communication of bearer data to the UE in particular PDSCH segments of the current subframe, the UE may then read the indicated PDSCH segment(s) of the current subframe to receive that bearer data.

Overview

In a wireless communication system in which multiple base stations provide wireless coverage areas each defining a continuum of subframes divided into time segments (such as but not limited to an LTE system), all of the base stations may be arranged by default to provide their control channels (e.g., PDCCHs) in the first time segments of each subframe and to then use the remaining time segments of each subframe for the shared channel (e.g., PDSCH). For instance, in LTE as noted above, each base station may provide its control channel space in the first one, two, or three symbol time segments per subframe, leaving the remaining symbol time segments largely for use to define the PDSCH. With this default arrangement, it may be convenient for the air interface to define a PCFICH in the first symbol time segment of each subframe, since the PDCCH in each subframe occupies at least the first symbol time segment. Further, the UEs being served by the base stations can determine, based on the physical cell ID and carrier bandwidth, the location of the PCFICH within the first symbol time segment. And the UEs can determine, based on the CFI carried by the PCFICH, the PDCCH arrangement. A problem that can arise with this default arrangement, however, is that control channel communication in one such coverage area could interfere with control channel communication in an overlapping coverage area. This problem could arise in any scenario where two or more base stations operate on the same carrier frequency as each other and provide overlapping coverage areas. By way of example, this could occur in a scenario where a wireless service provider operates a macro base station (e.g., a typical cell tower) that provides a wide coverage area and where one or more small cell base stations (e.g., femtocells, picocells, relay base station, or the like) are in use on the same frequency within the macro coverage area.

Such control channel interference can produce load issues with respect to both the control channel and the shared traffic channel. For instance, the interference between control channel communications could result in UEs failing to receive control signaling, which could necessitate retransmission of the control signaling and thus lead to an increase in control channel load. Further, to the extent control signaling in particular subframes schedules downlink data transmission in the same subframes, failure to receive that control signaling could also mean failure to receive the associated downlink data transmission, which could necessitate retransmission of the data and thus lead to an increase in traffic channel load. These issues can in turn result in reduced throughput and other undesirable conditions.

In order to help overcome this problem, in some wireless communication systems, adjacent base stations may programmatically work with each other to arrange for their respective use of different time segments per subframe for their respective control channel use, rather than by default providing their control channel spaces in the first one, two, or three symbol time segments per subframe. By way of example, of the 14 OFDM symbol time segments in each LTE subframe, two base stations that provide overlapping coverage may engage in signaling with each other to arrange for one of the base stations to use two particular ones of the symbol time segments for its PDCCH and for the other base station to use two other particular ones of the symbol time segments for its PDCCH.

With this alternative arrangement, the base stations may provide their PCFICHs in different symbol time segments (e.g., if their PDCCHs are in different time segments). For instance, a first base station may provide its PCFICH in a first symbol time segment, and a second base station may provide its PCFICH in a fifth time segment. Further, some base stations might also provide their PCFICHs in varying time segments over time (e.g., per subframe).

A unique issue that arises with the alternative arrangement, therefore, is how a base station that is serving UEs should inform the UEs of the arrangement of the control channel space in a given subframe. Unlike the default arrangement in which base stations always use at least the first time segment of each subframe for control signaling and provide PCFICHs in the first time segment of each subframe, in the alternative arrangement, the base stations may provide their PCFICHs in time segments other than the first time segment of each subframe. If a base station provides its PCFICH in a time segment other than the first time segment or provides its PCFICH in varying time segments over time, UEs being served by the base station might not be able to locate the PCFICH. Hence, it may become difficult for the UE to find and decode PDCCH information.

Disclosed herein is a method and system to help overcome this issue. In accordance with the disclosure, in each subframe, a base station may provide its PCFICH within any single time segment. The PCFICH may carry one of a plurality of predetermined binary codewords. After a UE receives modulated data transmitted from the base station in a given subframe, a UE may search through the modulated data to find the PCFICH of the given subframe. For example, the UE may scan through the modulated data in search of data that is arranged in a predefined structure of the PCFICH and cooperatively forms one of the plurality of predetermined binary codewords. Upon thereby finding the PCFICH of the given subframe, the UE may determine the CFI carried by the PCFICH and use the CFI as a basis to read a portion of the downlink control channel of the given subframe.

In some examples, after receiving modulated data transmitted from the base station in a given subframe, a UE may determine whether the PCFICH of a given subframe is located in a predefined time segment (e.g., the first time segment of the subframe). If the UE finds the PCFICH in the predefined time segment, the UE may determine the CFI carried by the PCFICH and use the CFI as a basis to read a portion of the downlink control channel of the given subframe. On the other hand, if the UE determines that the PCFICH is not located in the predefined time segment, the UE may search through the modulated data to find the PCFICH of the given subframe.

In some examples, the CFI carried by the PCFICH may indicate the number of time segments making up the control channel space, which could be predefined to start with the symbol in which the PCFICH exists. In some examples, the UE may refer to mapping data to determine which time segment(s) the downlink control channel of the given subframe occupies. For instance, the mapping data may correlate each of multiple CFIs with respective sets of one or more time segments, and the UE may refer to the mapping data to determine a particular set of one or more time segments that correspond to the CFI carried by the PCFICH of a given subframe.

Accordingly, in one respect, disclosed is a method operable in a wireless communication system in which a base station provides a coverage area in which to service UEs, with the coverage area defining a continuum of subframes. Each subframe is divided into a sequence of time segments in which the base station transmits modulated data. Each subframe, in turn, defines a downlink control channel, a downlink traffic channel, and a PCFICH that carries a CFI. The CFI indicates which of the time segments of the subframe the downlink control channel occupies. According to the method, a UE receives the modulated data transmitted from the base station in a given one of the subframes, and searches through the received modulated data to find the PCFICH of the given subframe. Upon thereby finding the PCFICH of the given subframe, the UE determines the CFI carried by the PCFICH of the given subframe. The UE then uses the CFI carried by the PCFICH of the given subframe as a basis to read a portion of the downlink control channel of the given subframe.

In another respect, disclosed is a UE. The UE includes a wireless communication interface for engaging in communication with a base station over an air interface, with the air interface defining, over time, subframes divided into a sequence of time segments in which the base station transmits modulated data. Each subframe defines a downlink control channel, a downlink traffic channel, and a PCFICH that carries a CFI. The CFI indicates which of the time segments of the subframe the downlink control channel occupies. The base station further includes a controller for processing communications that the wireless communication interface receives from the base station. In accordance with the disclosure, the controller is configured to receive the modulated data transmitted from the base station in a given one of the subframes and search through the received modulated data to find the PCFICH of the given subframe. Upon thereby finding the PCFICH, the controller is configured to determine the CFI carried by the PCFICH of the given subframe. And the controller is configured to use the CFI carried by the PCFICH of the given subframe as a basis to read a portion of the downlink control channel of the given subframe.

In still another respect, disclosed is another UE. The UE includes a wireless communication interface for engaging in communication with a base station over an air interface, with the air interface defining, over time, subframes divided into a sequence of time segments in which the base station transmits modulated data. Each subframe defines a downlink control channel, a downlink traffic channel, and a PCFICH that carries a CFI. The CFI indicates which of the time segments of the subframe the downlink control channel occupies. The base station further includes a controller for processing communications that the wireless communication interface receives from the base station. In accordance with the disclosure, the controller is configured to receive the modulated data transmitted from the base station in a given one of the subframes and determine whether the PCFICH of the given subframe is located in a predefined time segment in which the controller is configured to find PCFICHs. In addition, the controller is configured to determine the CFI carried by the PCFICH of the given subframe if the controller determines that the PCFICH is located in the predefined time segment of the given subframe, but search through the received modulated data to find the PCFICH of the given subframe if the controller determines that the PCFICH is not located in the predefined time segment.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 6 is a table depicting an example mapping of CFIs, binary codewords, and time segments.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
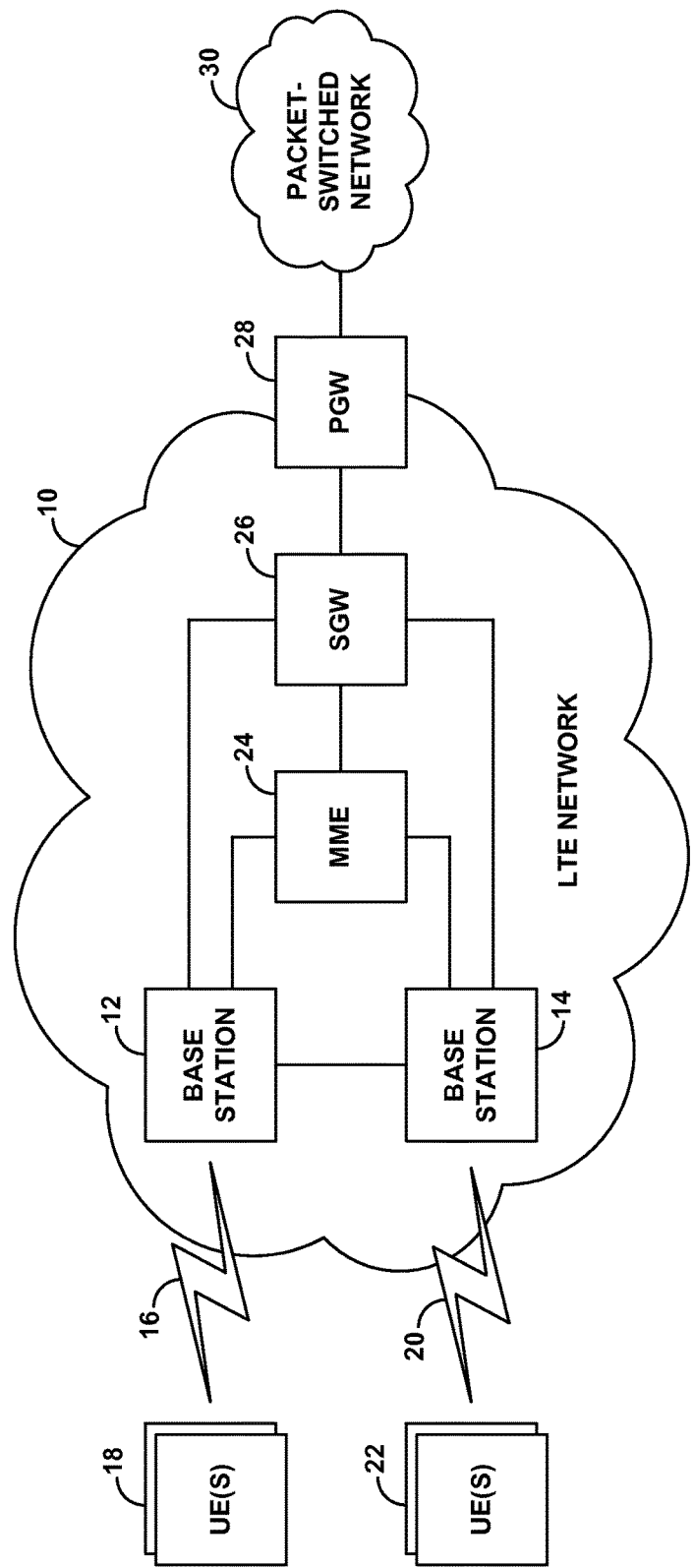
FIG. 1 is a simplified block diagram of an example wireless communication system in which features of the present disclosure can be implemented.

Referring to the drawings, as noted above, FIG. 1 is a simplified block diagram of an example wireless communication system in which features of the present disclosure can be implemented. In particular, FIG. 1 depicts a representative LTE network 10, which functions primarily to serve UEs with wireless packet data communication service, including possibly voice-over-packet service, but may also provide other functions. As shown, the LTE network includes two representative LTE base stations (evolved Node-Bs (eNodeBs)) 12, 14, each of which would have an antenna structure and associated equipment for providing a respective LTE coverage area in which to serve UEs. By way of example, eNodeB 12 is shown providing a coverage area 16 in which to serve one or more UEs 18, and eNodeB 14 is shown providing a coverage area 20 in which to serve one or more UEs 22. The UEs may take various forms, such as any of those noted above, whether or not operated by a human "user."

In practice, these base stations may be adjacent to each other in the wireless communication system. This adjacent relationship between the base stations could be defined in various ways. For instance, the base stations could be considered adjacent to each other if the base stations' respective coverage areas overlap with each other in whole or in part, as may be established by one or more UEs served by one of the base stations reporting to the serving base station that the UE(s) are detecting signals from the other base station. Alternatively or additionally, the base stations could be considered adjacent to each other simply if at least one of the base stations lists the other base station on a neighbor list useable to manage handover of UEs between the base stations. Physically, the base stations can be co-located or distributed at some distance from each other.

Further, the base stations themselves can take various forms. By way of example, either or each base station could be a macro base station of the type typically provided by a wireless service provider with a tower mounted antenna structure and associated equipment. Or either or each base station could be a small cell base station (such as a femtocell, picocell, or the like) typically provided to help improve coverage within macro cell coverage and usually having a much smaller form factor and coverage range than a macro base station. As a specific example, base station 12 could be a macro base station, and base station 14 could be a small cell base station positioned at least partially within coverage of the macro base station. Thus, the two base stations would provide overlapping coverage.

As further shown in the example arrangement of FIG. 1, the base stations have a communication interface (e.g., an LTE "X2" interface) with each other, and each base station has a communication interface with a mobility management entity (MME) 24 that functions as a signaling controller for the LTE network and may also facilitate communication between the base stations. Further, each base station then has a communication interface with a serving gateway (SGW) 26, which in turn has a communication interface with a packet-data network gateway (PGW) 28 that provides connectivity with a packet-switched network 30, and the MME 24 has a communication interface with the SGW 26. In practice, the illustrated components of the LTE network may sit as nodes on a private packet-switched network owned by an operator of the LTE network, and thus the various communication interfaces may be logical interfaces through that network.

Each base station may provide service on at least one particular carrier having a carrier bandwidth (such as 5 MHz or other bandwidth as discussed above), and the adjacent base stations may provide service on the same carrier as each other. As noted above, each base station's coverage area may then define a continuum of subframes in the time domain, with each subframe being divided into a sequence of time segments for communicating modulated data. Further, the base stations may be time synchronized with each other, so that their subframes and time segments within their subframes occur at the same time as each other (possibly with minor tolerance for variation). Thus, each base station's coverage area would start a new subframe at the same time as the other base station's coverage area, and the time segments within a subframe of one base station's coverage area would be aligned in time with the time segments of the other base station's coverage area. This time synchronization could be established by use of GPS timing or another mechanism.

Figure 2:
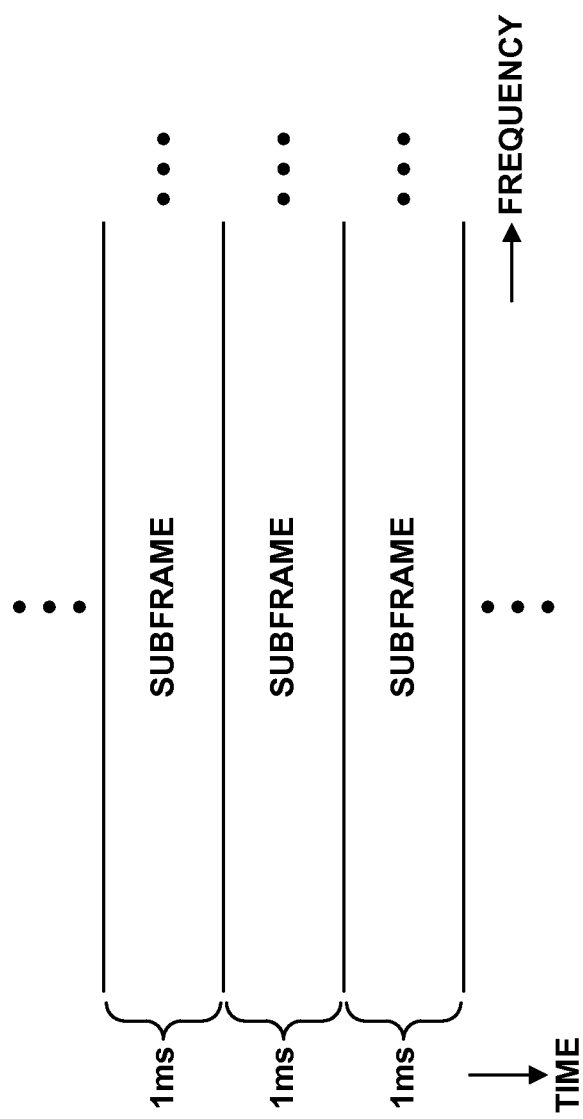
FIG. 2 is an illustration of a portion of an example continuum of subframes.

FIG. 2 depicts a portion of an example continuum of subframes in a representative LTE coverage area, shown within a portion of the example carrier bandwidth. As illustrated in FIG. 2, the subframes of the continuum are 1 ms each, and the continuum would continue before and after the portion of time shown. Although the continuum is shown with no separation between the subframes, the continuum could just as well be defined with separation between the subframes. For instance, every other 1 ms could define a next subframe, or some other repeating pattern could define occurrences of subframes.

Figure 3:
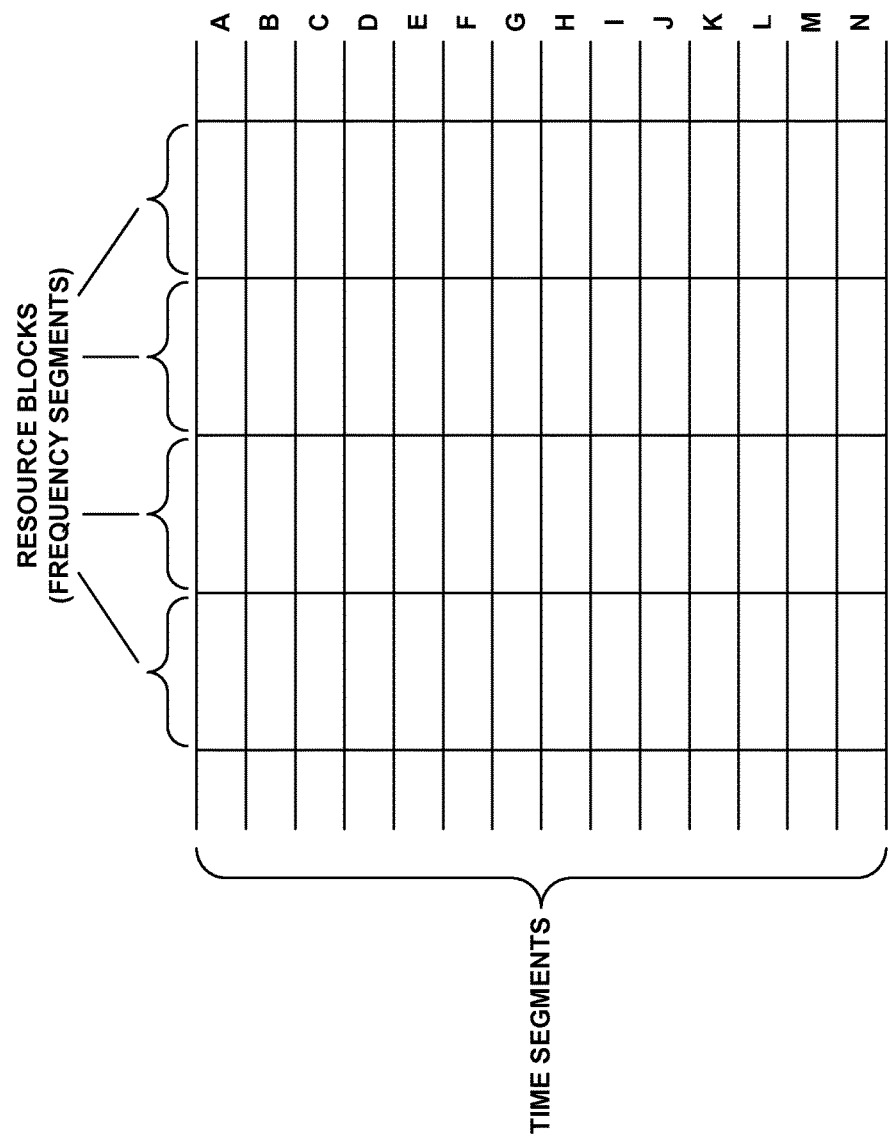
FIG. 3 is an illustration of an example subframe, depicting an example sequence of time segments within the subframe.

FIG. 3 next depicts an example of one of the subframes, also shown within a portion of the example carrier bandwidth. As illustrated in FIG. 3, the example subframe is divided over time into a sequence of 14 symbol time segments labeled A through N in their order of occurrence, each of which may be 66.7 microseconds or the like. As with the subframe timing, although the sequence of these time segments is shown with one time segment right after another and with the sequence of time segments spanning the full duration of the subframe, the sequence could be defined in other ways, such as including just certain time segments within the subframe. In practice, the illustrated sequence of time segments may repeat for each successive subframe of the continuum of subframes.

As discussed above, in a typical LTE implementation, the first one, two, or three symbol time segments in each subframe would be used to define downlink control channel space (e.g., for PDCCH and PHICH communication), and the remaining symbol time segments in each subframe would then be used to define downlink shared channel space (e.g., for PDSCH communication), with the understanding that certain resource elements would be reserved for other purposes (such as to carry reference signals for instance).

Figure 4:
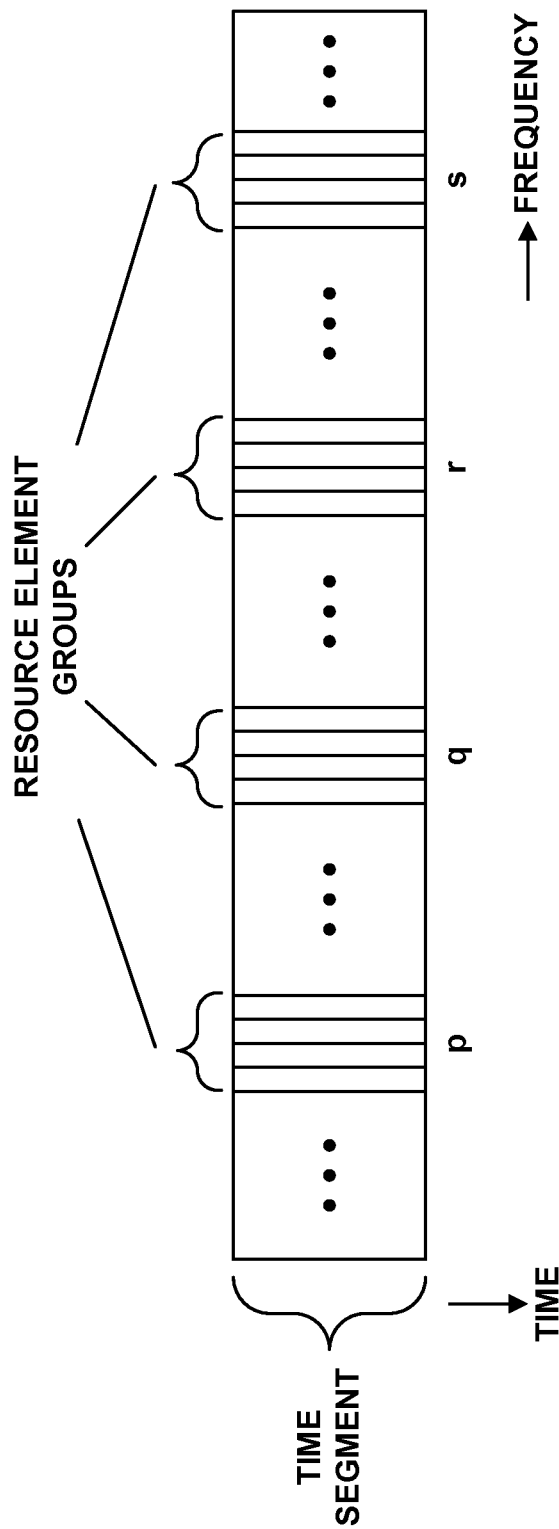
FIG. 4 is an illustration of an example time segment, depicting an example set of resource element groups within the time segment.

Furthermore, in the typical LTE implementation, the first symbol time segment in each subframe would be used to define a PCFICH. The PCFICH may be defined in 16 resource elements spread across four REGs, with each REG equidistantly spread apart from each other across the symbol time segment. FIG. 4 depicts an example of a PCFICH provided in a time segment. As illustrated in FIG. 4, the example time segment is divided into a sequence of resource elements, each of which may be 15 kHz or the like. For ease of explanation, only a portion of the resource elements are shown. In particular, 16 resource elements spread over four REGs labeled p through s in their order of occurrence are shown. The illustrated sequence of resource elements may repeat for each time segment of each subframe. Further, the resource elements of the REGs may be separated by one or more resource elements used to carry reference signals (not shown).

As discussed above, the four REGs may be equidistantly spread apart from each other within the time segment. By way of example, each LTE symbol time segment of each subframe on a 10 MHz carrier may include 50 resource blocks each having two REGs, for a total of 100 REGs. (Although, if a symbol time segment does not include any reference signals, each resource block may have three REGs, for a total of 150 REGs). Assuming there are 100 available REGs in a particular symbol time segment and given the condition that each of the REGs be equidistantly spread apart from each other, 25 (i.e., 100/4) unique PCFICH locations are possible within the particular symbol time segment. For instance, in one arrangement, the p REG could be located in REG 1, with the q REG located in REG 26, the r REG located in REG 51, and the s REG located in REG 76. Or in another arrangement, the p REG could be located in REG 2, with the q REG located in REG 27, the r REG located in REG 52, and the s REG located in REG 77.

Further, each of the 16 resource elements of the PCFICH may carry a QPSK modulation symbol representing two bits, such that the 16 resource elements carry 32 bits of data and cooperatively form a binary codeword referred to as a CFI. As an example, the four resource elements of the p REG may each carry 2 bits of data, with the four resource elements collectively forming a first 8-bit string, the four resource elements of the q REG may each carry 2 bits of data forming a second 8-bit string, the four resource elements of the r REG may each carry 2 bits of data forming a third 8-bit string, and the four resource elements of the s REG may each carry 2 bits of data forming a fourth 8-bit string. In combination, the first, second, third, and fourth 8-bit strings may then form a 32-bit string.

In the typical LTE implementation, the 32-bit string may be one of three possible 32-bit strings, each 32-bit string corresponding to a respective CFI and control channel space configuration. In particular, a first 32-bit string may correspond to a CFI of 1 meaning that the control channel space occupies the first symbol time segment of a subframe, a second 32-bit string may correspond to a CFI of 2 meaning that the control channel space occupies the first and second symbol time segments of a subframe, and a third 32-bit string may correspond to a CFI of 3 meaning that the control channel space occupies the first symbol time segment of a subframe.

As also discussed above, in an alternative LTE implementation, adjacent base stations may work with each other (e.g., to engage in inter-base station signaling with each other) so as to arrange for their use of different time segments than each other per subframe for their respective downlink control channel communication, and for each base station to not use for downlink control channel communication the time segments that the other base station will be using for downlink control channel communication. Further, to additionally help avoid interference with control channel communication, each base station may also operate to avoid using for downlink traffic channel communication the time segments that the other base station will be using for downlink control channel communication in accordance with the arrangement for the base stations to use different ones of the time segments per subframe for their respective downlink control channel communication.

In practice, for instance, base station 12 may select one or more time segments for base station 12 to use per subframe for downlink control channel communication and may transmit a signal to base station 14, notifying base station 14 that base station 12 will be using the selected time segment(s) for downlink control channel communication. (The selected time segments per subframe could be contiguous, as is the case with the default LTE control channel space, or could be non-contiguous.) Further, base station 14 may select one or more other time segments for base station 14 to use per subframe for downlink control channel communication, perhaps in response to the signal from base station 12, and may transmit a signal to base station 12 notifying base station 12 that base station 14 will be using the selected time segment(s) for downlink control channel communication. Alternatively, this arrangement process could have one of the base stations managing the allocation of time segments between the base stations for downlink control channel use, such as directing the other base station which time segments per subframe to use, and/or could involve input or directives from one or more other entities, such as MME 24 for instance.

With the agreement in place for one base station to use one set of time segment(s) per subframe for downlink control channel communication and for an adjacent other base station to use a different (mutually exclusive) set of time segment(s) per subframe for downlink control channel communication, each base station may then engage in downlink control channel communication accordingly. In particular, each base station may provide its downlink control channel communication in the time segment(s) that it is set to use for downlink control channel communication and not in the time segment(s) that the adjacent base station is set to use for downlink control channel communication. Further, each base station may also forgo engaging in downlink traffic channel communication in the time segment(s) that the adjacent base station is set to use for downlink control channel communication.

Figure 5:
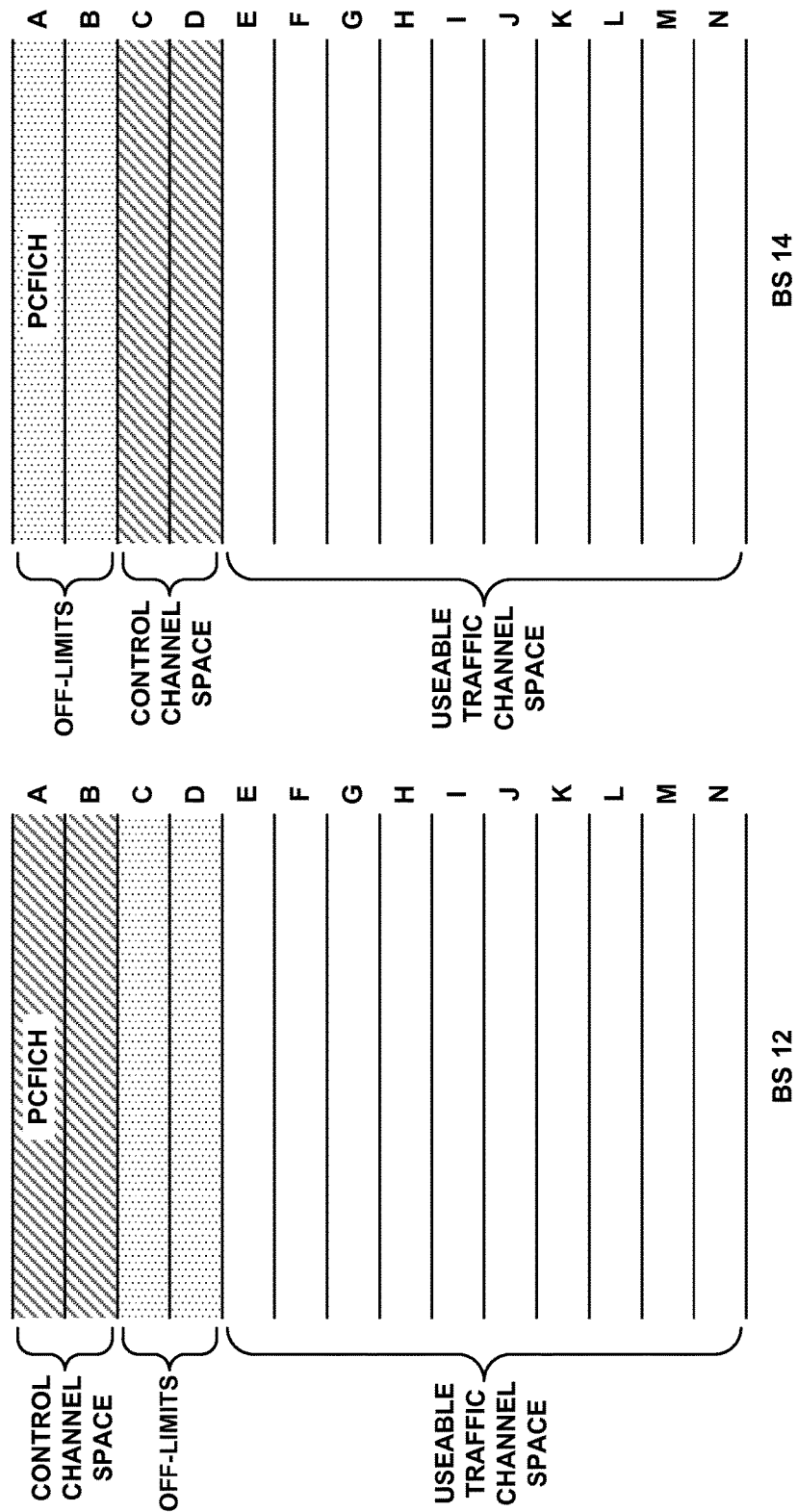
FIG. 5 is an illustration of time synchronized subframes of adjacent base station coverage areas but with the coverage areas using different time segments than each other for control channel space.

FIG. 5 illustrates one of many possible arrangements for use of time segments per subframe as between adjacent base stations in accordance with this process. In particular, FIG. 5 depicts base station 12 as being set to use time segments A and B as its downlink control channel space, and base station 14 as being set to use time segments C and D as its downlink control channel space. (Although this example shows the base stations as using time segments at the start of a subframe, each base station in this process could be set to use various time segments per subframe. For instance, one base station could use time segments C and D, and the other base station could use time segments F and G.) Further, base station 12 could provide its PCFICH in time segment A or B, and base station 14 could provide its PCFICH in time segment C or D. Alternatively, the base stations could instead provide their PCFICHs in one of the time segments of the useable traffic channel space (i.e. time segments E through N).

With this arrangement, base station 12 could then use remaining time segments C through N as its downlink traffic channel space, but base station 12 may advantageously forgo downlink traffic channel transmission in time segments C and D to help further reduce control channel interference for base station 14. Likewise, base station 14 could use remaining time segments A, B, and E through N as its downlink traffic channel space, but base station 14 may advantageously forgo downlink traffic channel transmission in time segments A and B to help further reduce control channel interference for base station 12. To facilitate this, when each base station allocates a particular resource block to a UE for downlink traffic channel communication, the base station may just not transmit in the time segments that the other base station is set to use for downlink control channel communication but may restrict its downlink traffic channel communication to the other remaining time segments.

As further noted above, however, a question arises as to how the base stations should inform the UEs of the arrangement of the control channel space in each subframe, since the base stations might not always provide their PCFICHs in the first symbol time segment. By way of example, as mentioned above, base station 14 could provide its PCFICH in time segment C or D rather than providing its PCFICH in time segment A. If base station 14 provides its PCFICH in time segment C or D rather than providing its PCFICH in time segment A, UEs being served by the base station may not be able to locate the PCFICH, leading to issues such as those noted above.

To help address this issue, the present disclosure provides a technique for a UE to find the PCFICH of a subframe in a scenario where a base station may provide its PCFICH in different time segments over time (e.g., per subframe). In accordance with the present disclosure, a UE may receive modulated data transmitted from the base station in a given subframe, and the UE may search through the modulated data to find the PCFICH of the given subframe, with the searching based on the expectation of the PCFICH having a predefined structure and carrying a CFI.

In practice, for instance, base station 12 may select one or more time segments for the base station 12 to use in a given subframe for downlink control channel communication and determine a particular CFI corresponding to the one or more time segments. FIG. 6 is a table depicting an example mapping of CFIs, binary codewords, and time segments, which the base station 12 could use to determine the particular CFI corresponding to the selected one or more time segments. The left column in the table shows CFIs, the middle column in the table shows binary codewords, and the right column shows the one or more time segments to which the CFIs correspond. As indicated in FIG. 6, the selected time segments per subframe could be contiguous, as in the case with the default LTE control channel space, or could be non-contiguous. As in the typical LTE implementation, each CFI may correspond to a binary codeword that the base station transmits within 16 resource elements of a subframe.

The base station 12 may also select a particular time segment in which to define the PCFICH, such as one of the one more time segments selected for the downlink control channel communication, or perhaps another time segment of the given subframe. In one example, the base station 12 may be configured to provide its control channel space in one, two, or three contiguous time segments, with the time segments starting in any of the first 11 time segments of a subframe. With this arrangement, the base station 12 could determine the CFI using a mapping that is similar to the mapping in the typical LTE implementation. For instance, the base station 12 may select a CFI of 1, 2, or 3 depending on whether the control channel space is provided in one, two, or three contiguous time segments. And the base station 12 could then be arranged to define the PCFICH in the first time segment the control channel space occupies. In this manner, the CFI may indicate that the number of time segments the control channel occupies, and the time segment in which the PCFICH is located may indicate the first time segment that the control channel space occupies.

Further, the base station 12 may also select a particular location for the PCFICH within the particular time segment. In some examples, as in the typical LTE implementation, the base station 12 may use a formula having inputs of the base station's physical cell ID and carrier bandwidth to determine the particular location within the particular time segment. Alternatively, the base station 12 may randomly select the particular location within the particular time segment from among the various possible locations for providing the PCFICH. As in the typical LTE implementation, the PCFICH may have a predefined structure. Specifically, the PCFICH may be defined in four REGs that are equidistantly spread apart from each other within a particular frequency bandwidth. By way of example, if the subframe is defined on a 10 MHz carrier having 100 REGs per time segment, the four REGs may be 25 REGs apart from each other.

After determining the particular time segment in which to provide the PCFICH, the particular CFI, and the particular location of the PCFICH within the particular time segment, the base station 12 may then include the particular CFI in in the particular location of the particular time segment when transmitting modulated data to the UEs 18.

In line with the discussion above, a UE that receives modulated data from the base station in a given subframe may search through the modulated data to find the PCFICH of that subframe. In practice, when searching through the modulated data, the UE may look for data that is arranged in the predefined structure of the PCFICH and cooperatively forms one of a plurality of predetermined binary codewords. By way of example, the UE may demodulate the data from different sets of REGs that are located where a PCFICH could possibly be provided, and evaluate whether a 32-bit string formed by the demodulated data forms one of a plurality of predetermined binary codewords.

According to one approach, a UE may begin its search with a particular time segment (e.g., the first time segment), and demodulate the data carried by REGs in a first possible location for a PCFICH. For instance, assuming the carrier in which the subframe is defined is a 10 MHz carrier, the UE may demodulate the data carried by REGs 1, 26, 51, and 76. The demodulated data for each REG may form an 8-bit string, and in combination, a 32-bit string. The UE may then evaluate whether the 32-bit string is one of a plurality of predetermined binary codewords. If the 32-bit string is one of a plurality of predetermined binary codewords, the UE may end its search. On the other hand, if the 32-bit string is not one of the plurality of predetermined binary codewords, the UE may proceed to demodulate the data carried by REGs in a second possible location. The UE may repeat this process until finding a 32-bit string that is one of the plurality of predetermined binary codewords. In practice, the UE may in parallel demodulate and evaluate the data carried by REGs in different possible locations for PCFICHs, rather than searching through the different possible locations for PCFICHs in a sequential manner.

If the UE does not find within the particular time segment a 32-bit string that that is one of the plurality of predetermined binary codewords, the UE may continue its search in another time segment (e.g., the second time segment). In practice, the UE may search in parallel through multiple different time segments using the approach outline above, rather than searching through time segments in a sequential manner.

In the example arrangement described above, in which the base station 12 is arranged to use a formula having inputs of the base station's physical cell ID and carrier bandwidth to determine the particular location of the PCFICH within a time segment, the UE may be arranged to use the same formula to determine an expected location of the PCFICH within a time segment. The UE, however, may be unaware of the particular time segment in which the PCFICH is provided. Thus, the UE may search through the different time segments of the subframe, either sequentially or in parallel, to find the PCFICH. For instance, the UE may use the formula to determine that the PCFICH is defined in the 3rd, 28th, 53rd, and 78th REGs of a time segment, and then check, time segment by time segment, whether the data carried by these REGs corresponds to one of a plurality of predetermined binary codewords.

In some examples, as in the typical LTE implementation, the UE may be arranged to use the formula described above to determine a particular location within the first time segment to check for the presence of the PCFICH. Further, the UE may be arranged to initially determine whether the PCFICH is located at the particular location with the first time segment. If the base station provided the PCFICH in the first time segment at the particular location, the UE may find the PCFICH there, and not need to search for the PCFICH. If, however, the base station provided the PCFICH elsewhere (e.g., at a different location within the first time segment or within a different time segment) and the UE determines by checking the particular location within the first time segment that the PCFICH is not located there, the UE may then search through the modulated data received from the base station in the given subframe to find the PCFICH.

In another example, the UE may be arranged to search through the modulated data of a time segment in search of four REGs carrying data that cooperatively forms one of a plurality of predetermined binary codewords. The four REGs may be any of the REGs of the time segment, and might not be equidistantly spaced apart from each other within the time segment. Further, in some instances, the UE may be arranged to search through the modulated data of a time segment in search for 16 resource elements carrying data that forms one of the plurality of predetermined binary codewords. In other words, in some examples, the UE may be arranged to search through the modulated data of a time segment without the searching being based on the PCFICH having a predefined structure.

In practice, after finding the PCFICH of the subframe (e.g., by finding one of a plurality of predetermined binary codewords within a possible location for a PCFICH), the UE may then determine the CFI carried by the PCFICH and use the CFI as a basis to determine the time segment(s) of the subframe the control channel space occupies.

In one scenario, the base station 12 may be arranged to use the mapping shown in the table of FIG. 6 when determining the CFI. With this arrangement, the UE may also be arranged to use the mapping shown in the table of FIG. 6 to determine a CFI corresponding to one of a plurality of predetermined binary codewords the UE finds, and determine the time segment(s) corresponding to that CFI.

Alternatively, the base station 12 may be arranged to define the PCFICH in the first time segment that the control channel space occupies, and the UE may be arranged to recognize that the time segment in which the PCFICH is defined is the first time segment of the control channel space. Further, the base station might also be arranged to select a CFI of 1, 2, or 3 depending on whether the control channel space is provided in one, two, or three contiguous time segments. With this arrangement, the UE may determine whether the binary codeword that the UE found corresponds to the CFI of 1, 2, or 3, and depending on the CFI, determine that the control channel space occupies either one, two, or three time segments starting with the time segment in which the PCFICH is defined.

Upon determining the time segments of the subframe that the control channel space occupies, the UE may then decode a portion of the control channel space of the subframe. In line with the discussion above, the control channel space may include one or more DCI messages having one or more particular RNTIs. Accordingly, the UE may look through the control channel space in search of one or more particular RNTIs. If the UE finds such a DCI message, the UE may then read that DCI message and proceed as indicated. For instance, if the DCI message schedules downlink communication of bearer data to the UE in a portion of another time segment of the subframe (e.g., a PDSCH segments), the UE may then read the indicated portion to receive that bearer data.

In practice, it is possible that a UE may happen to identify one of a plurality of predetermined binary codewords in a location that the base station 12 did not actually define the PCFICH. In this scenario, the UE may nevertheless operate under the assumption that it identified the PCFICH, determining a control channel space corresponding to the identified binary codeword using one of the approaches discussed above. The UE, however, may be unable to decode any of the CCEs in that control channel space without detecting CRC errors. Accordingly, in response to being unable to decode any of the CCEs in the control channel space, the UE may continue searching through the modulated data to find the actual PCFICH.

Figure 7:
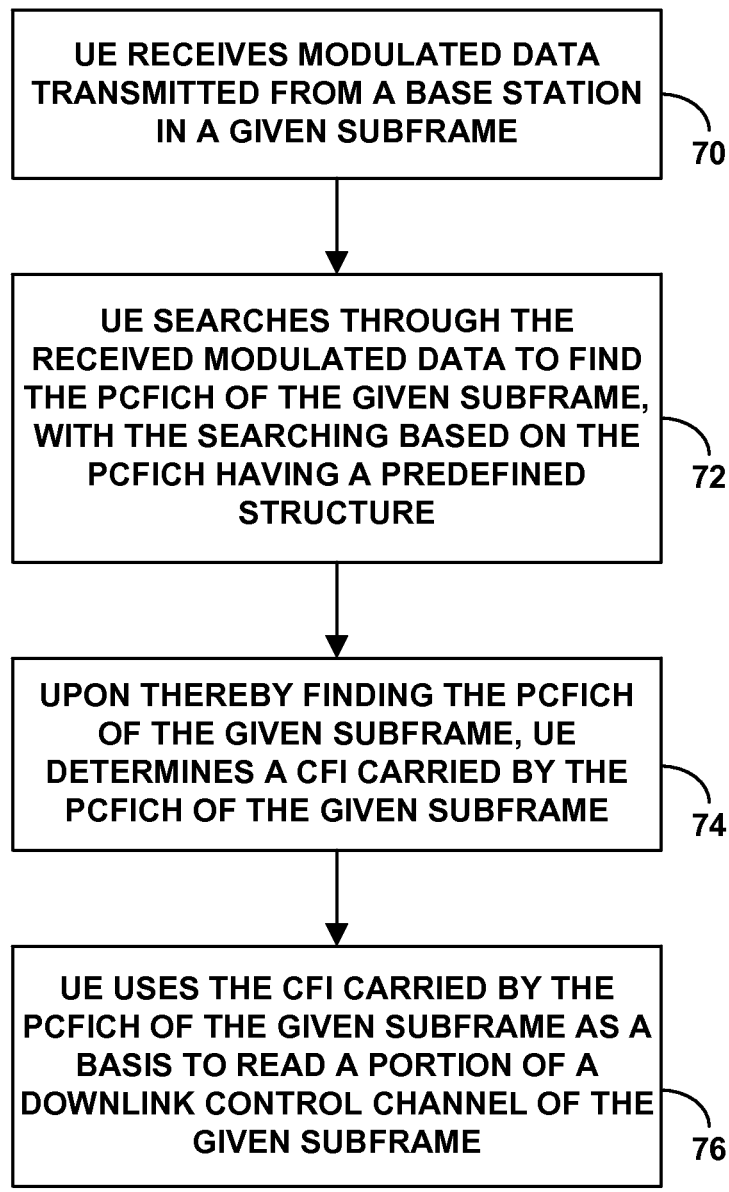
FIG. 7 is a flow chart depicting example operations in accordance with the disclosure.

FIG. 7 is next a flow chart depicting operations that can be carried out in accordance with the present disclosure. In line with the discussion above, an air interface may define, over time, subframes divided into a sequence of time segments in which a base station transmits modulated data. Further, each subframe may define a downlink control channel, a downlink traffic channel, and a PCFICH that carries a CFI. As shown in FIG. 7, at block 70, a UE receives modulated data transmitted from a base station in a given subframe. At block 72, the UE searches through the received modulated data to find the PCFICH of the given subframe, with the searching based on the PCFICH having a predefined structure. For instance, the UE may search through the received modulated data in search of data that is arranged in the predefined structure of the PCFICH and cooperatively forms one of a plurality of predetermined binary codewords. At block 74, upon thereby finding the PCFICH of the given subframe, the UE determines a CFI carried by the PCFICH of the given subframe. And at block 76, the UE uses the CFI carried by the PCFICH of the given subframe as a basis to read a portion of the given subframe.

Figure 8:
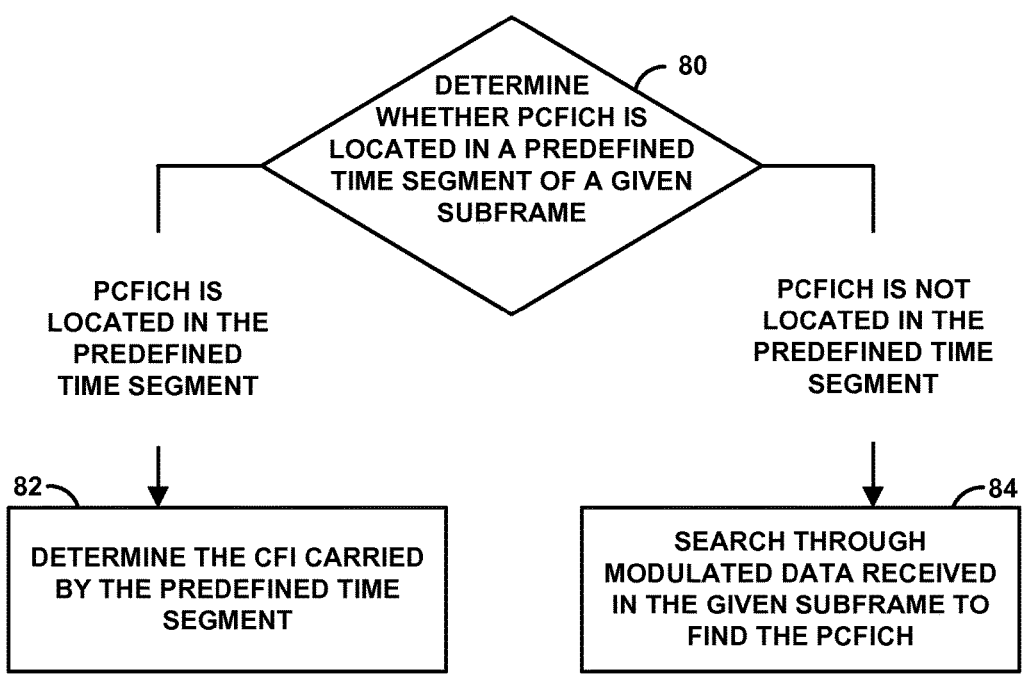
FIG. 8 is another flow chart depicting example operations in accordance with the disclosure.

FIG. 8 is next another flow chart depicting functions that can be carried out in accordance with the present disclosure. In line with the discussion above, an air interface may define, over time, subframes divided into a sequence of time segments in which a base station transmits modulated data. Further, each subframe may define a downlink control channel, a downlink traffic channel, and a PCFICH that carries a CFI. As shown in FIG. 8, at block 80, a UE may determine whether the PCFICH is located in a predefined time segment of given subframe. For instance, the UE may determine an expected location of the PCFICH within the predefined time segment using a formula having inputs of a physical cell ID and carrier bandwidth. And the UE may determine whether the PCFICH is located at the expected location in the predefined time segment.

And at blocks 82 and 84, the UE then performs certain operations based on whether or not the PCFICH is located in the predefined time segment of the given subframe. In particular, if the PCFICH is located in the predefined time segment of the given subframe, then, at block 82, the UE determines the CFI carried by the predefined time segment. Whereas, if the PCFICH is not located in the predefined time segment of the given subframe, then, at block 84, the UE searches through modulated data received in the given subframe to find the PCFICH.

Figure 9:
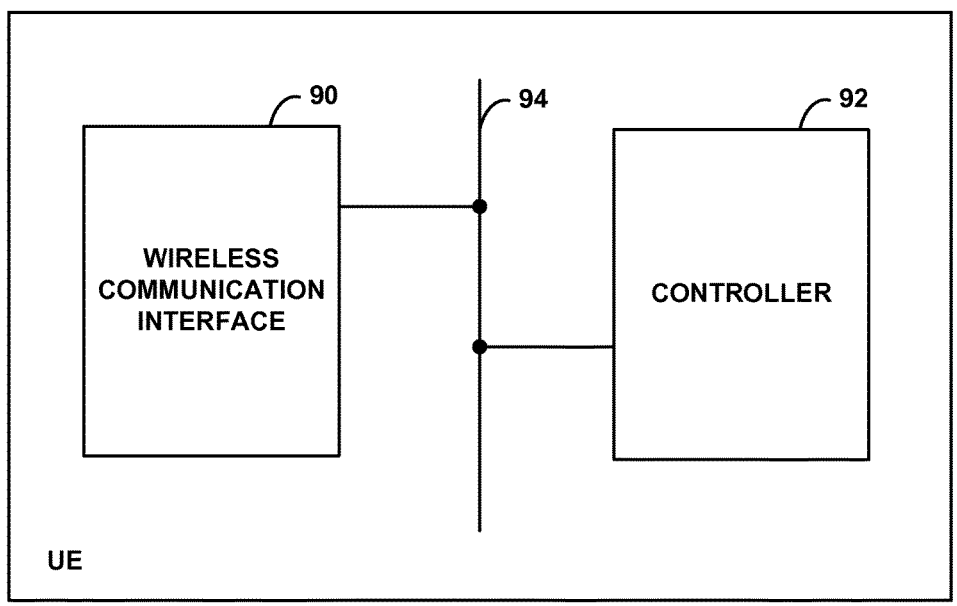
FIG. 9 is a simplified block diagram of an example UE operable in accordance with the disclosure.

Finally, FIG. 9 is a simplified block diagram of an example UE, showing some of the components of such a UE to facilitate operation in accordance with the present disclosure, with the understanding that numerous variations are possible. As shown in FIG. 9, the example UE includes a wireless communication interface 90 and a controller 92, communicatively linked together by a system bus, network, or other connection mechanism 94 or perhaps integrated to some extent.

Wireless communication interface 90 may include a power amplifier, cellular transceiver, and antenna structure (not shown) and may function to engage in communication with a base station over an air interface as described above. Controller 92, which may comprise one or more processing units programmed with instructions to carry out various functions, may then process communications that the wireless communication interface receives from the base station.

In line with the discussion above, when the controller receives modulated data transmitted from the base station in a given one of the subframes, the controller may search through the received modulated data to find the PCFICH of the given subframe. In some instances, the controller may determine whether the PCFICH of the given subframe is located in a predefined time segment of the given segment in which the controller is configured to find PCFICHs. If the controller determines that the PCFICH is located in the predefined time segment, the controller may then determine the CFI carried by the PCFICH. Whereas, if the controller determines that the PCFICH is not located in the predefined time segment, the controller may then search through the received modulated data to find the PCFICH.

Exemplary embodiments have been described above. Those skilled in the art will understand, however, that changes and modifications may be made to these embodiments without departing from the true scope and spirit of the invention.

We claim:

1. In a wireless communication system in which a base station provides a coverage area in which to serve user equipment devices (UEs), the coverage area defining a continuum of subframes, wherein each subframe is divided into a sequence of time segments in which the base station transmits modulated data, and wherein each subframe defines a downlink control channel, a downlink traffic channel, and a physical control format indicator channel (PCFICH) that carries a control format indicator (CFI), the CFI indicating which of the time segments of the subframe the downlink control channel occupies, a method comprising:
   receiving, by a UE, the modulated data transmitted from the base station in a given one of the subframes;
   demodulating, by the UE, at least a portion of the received modulated data;
   searching, by the UE, through the demodulated data to find the PCFICH of the given subframe, wherein the UE searching through the demodulated data to find the PCFICH of the given subframe comprises searching through the demodulated to determine which time segment the PCFICH occupies;
   upon thereby finding the PCFICH of the given subframe, determining, by the UE, the CFI carried by the PCFICH of the given subframe; and
   using, by the UE, the determined CFI carried by the PCFICH of the given subframe as a basis for the UE to read a portion of the downlink control channel of the given subframe.

2. The method of claim 1, further comprising:
   making a determination, by the UE, that the PCFICH of the given subframe is not located in a predefined time segment in which the UE is configured to find PCFICHs,
   wherein the UE searches through the demodulated data to find the PCFICH of the given subframe in response to at least making the determination.

3. The method of claim 1:
   wherein the coverage area operates on a particular frequency bandwidth,
   wherein each of the time segments of the given subframe comprises a continuum of resource elements spanning the particular frequency bandwidth, and
   wherein the UE searching through the demodulated data to find the PCFICH of the given subframe comprises searching through the demodulated data in search of a set of resource element groups (REGs) that cooperatively form one of a plurality of predetermined binary codewords.

4. The method of claim 3, wherein the UE searching through the demodulated data in search of the set of REGs further comprises searching through the demodulated data in search of a set of REGs that are equidistantly spread apart from each other within the particular frequency bandwidth.

5. The method of claim 1, wherein the UE using the determined CFI carried by the PCFICH of the given subframe as the basis to read the portion of the downlink control channel of the given subframe comprises:
   using, by the UE, the determined CFI carried by the PCFICH of the given subframe as a basis to determine one or more time segments of the given subframe that the downlink control channel of the given subframe occupies, and
   based on the determined one or more time segments of the given subframe, decoding, by the UE, a portion of the downlink control channel of the given subframe.

6. The method of claim 5, wherein the CFI carried by the PCFICH of the given subframe indicates that the downlink control channel of the given subframe occupies one or more particular time segments of the given subframe.

7. The method of claim 6:
   wherein the PCFICH is located in a given time segment of the given subframe, and
      wherein the CFI carried by the PCFICH of the given subframe indicates that the downlink control channel of the given subframe occupies at least the given time segment.

8. The method of claim 5:
   wherein the CFI carried by the PCFICH comprises a binary codeword,
   wherein the UE using the determined CFI carried by the PCFICH of the given subframe as a basis to determine one or more time segments of the given subframe that the downlink control channel of the given subframe occupies comprises:

the UE reading the determined CFI to determine the binary codeword; and the UE referring to data that correlates each of multiple binary codewords with respective sets of one or more time segments to determine which particular set of one or more time segments the downlink control channel of the given subframe occupies.

9. The method of claim 1, wherein the coverage area defines an orthogonal frequency division multiple access air interface, and wherein the time segments are symbol time segments.

10. The method of claim 1, wherein the PCFICH has a predefined structure, and wherein the searching is based on the PCFICH having the predefined structure.

11. A user equipment device (UE) comprising:
a wireless communication interface for engaging in communication with a base station over an air interface, wherein the air interface defines, over time, subframes divided into a sequence of time segments in which the base station transmits modulated data, and wherein each subframe defines a downlink control channel, a downlink traffic channel, and a physical control format indicator channel (PCFICH) that carries a control format indicator (CFI), the CFI indicating which of the time segments of the subframe the downlink control channel occupies; and
a controller for processing communications that the wireless communication interface receives from the base station, wherein the controller is configured to:
receive the modulated data transmitted from the base station in a given one of the subframes,
demodulate at least a portion of the received modulated data,
search through the demodulated data to find the PCFICH of the given subframe, wherein searching through the demodulated data to find the PCFICH of the given subframe comprises searching through the demodulated data to determine which time segment the PCFICH occupies,
upon thereby finding the PCFICH of the given subframe, determine the CFI carried by the PCFICH of the given subframe, and
use the determined CFI carried by the PCFICH of the given subframe as a basis to read a portion of the downlink control channel of the given subframe.

12. The UE of claim 11, wherein the controller is further configured to:
make a determination that the PCFICH of the given subframe is not located in a default time segment of the given subframe, and
search through the demodulated data to find the PCFICH of the given subframe in response to at least making the determination.

13. The UE of claim 12:
wherein the subframes are defined on a particular frequency bandwidth,
wherein each of the time segments of the given subframe comprises a continuum of resource elements spanning the particular frequency bandwidth, and
wherein searching through demodulated data to find the PCFICH of the given subframe comprises searching through the demodulated data in search of a set of resource element groups (REGs) that cooperatively form one of a plurality of predetermined binary codewords.

14. The UE of claim 13, wherein searching through the demodulated data in search of the set of REGs further comprises searching through the demodulated data in search of a set of REGs that are equidistantly spread apart from each other within the particular frequency bandwidth.

15. The UE of claim 11, wherein using the determined CFI carried by the PCFICH of the given subframe as the basis to read the portion of the downlink control channel comprises:
using the determined CFI carried by the PCFICH of the given subframe as a basis to determine one or more time segments of the given subframe that the downlink control channel of the given subframe occupies, and
based on the determined one or more time segments of the given subframe, decoding a portion of the downlink control channel of the given subframe.

16. A user equipment device (UE) comprising:
a wireless communication interface for engaging in communication with a base station over an air interface, wherein the air interface defines, over time, subframes divided into a sequence of time segments in which the base station transmits modulated data, and wherein each subframe defines a downlink control channel, a downlink traffic channel, and a physical control format indicator channel (PCFICH) that carries a control format indicator (CFI), the CFI indicating which of the time segments of the subframe the downlink control channel occupies; and
a controller for processing communications that the wireless communication interface receives from the base station, wherein the controller is configured to:
receive the modulated data transmitted from the base station in a given one of the subframes,
demodulate at least a portion of the received modulated data,
determine whether the PCFICH of the given subframe is located in a predefined time segment in which the controller is configured to find PCFICHs, and
determine the CFI carried by the PCFICH of the given subframe if the controller determines that the PCFICH is located in the predefined time segment of the given subframe, but search through the demodulated data to find the PCFICH of the given subframe if the controller determines that the PCFICH is not located in the predefined time segment wherein searching through the demodulated data to find the PCFICH of the given subframe comprises searching through the demodulated data to determine which time segment the PCFICH occupies.

17. The UE of claim 16:
wherein the subframes are defined on a particular frequency bandwidth,
wherein each of the time segments of the given subframe comprises a continuum of resource elements spanning the particular frequency bandwidth, and
wherein searching through the demodulated data to find the PCFICH of the given subframe comprises searching through the demodulated data in search of a set of resource element groups (REGs) that cooperatively form one of a plurality of predetermined binary codewords.

18. The UE of claim 17, wherein searching through the demodulated data in search of the set of REGs further comprises searching through the demodulated data in search of a set of REGs that are equidistantly spread apart from each other within the particular frequency bandwidth.

19. The UE of claim 16:
wherein the subframes are defined on a particular frequency bandwidth, wherein each of the time segments of the given subframe comprises a continuum of resource elements spanning the particular frequency bandwidth, and wherein determining whether the PCFICH of the given subframe is located in the predefined time segment in which the controller is configured to find PCFICHs comprises determining whether a set of resource element groups (REGs) located within the predefined time segment cooperatively form one of a plurality of predetermined binary codewords.

\* \* \* \* \*